United States Patent [19]
Alexander

[11] 4,134,295
[45] Jan. 16, 1979

[54] FLUID FLOW FORCE AND DIRECTION TRANSDUCER SYSTEM

[76] Inventor: William Alexander, 784 Dixon Way, Los Altos, Calif. 94022

[21] Appl. No.: 852,811

[22] Filed: Nov. 18, 1977

[51] Int. Cl.² .............................................. G01W 1/02
[52] U.S. Cl. .................................................... 73/189
[58] Field of Search ..................... 73/189, 228; 33/312; 338/44, 47, 94, 156, 222

[56] References Cited
U.S. PATENT DOCUMENTS

| | | | |
|---|---|---|---|
| 2,462,577 | 2/1949 | Warren | 73/189 |
| 3,370,462 | 2/1968 | Bartlett et al. | 73/189 |
| 3,552,204 | 1/1971 | Tourmen | 73/189 X |

Primary Examiner—Jerry W. Myracle

[57] ABSTRACT

A force and direction transducer system employs means providing a varying impedance in response to applied force. Further, the direction of the force is determined by the location where a ball of mercury, carried within a drag body, settles in a manner to couple an elongate resistance element between first and second connections.

16 Claims, 10 Drawing Figures

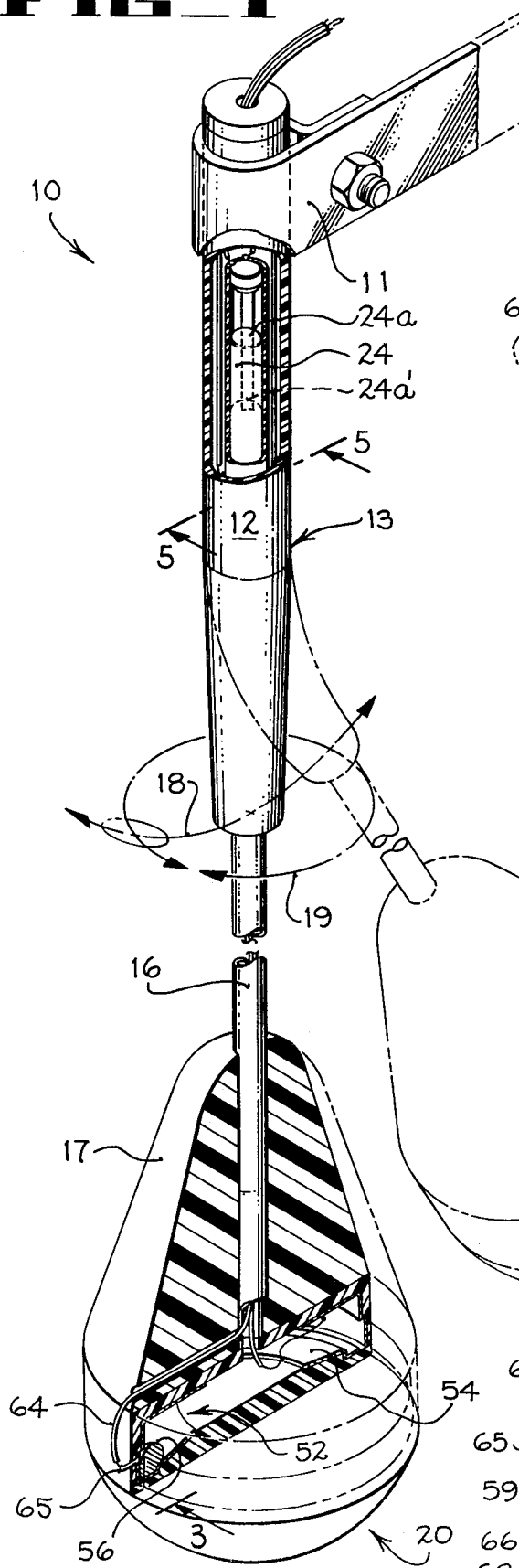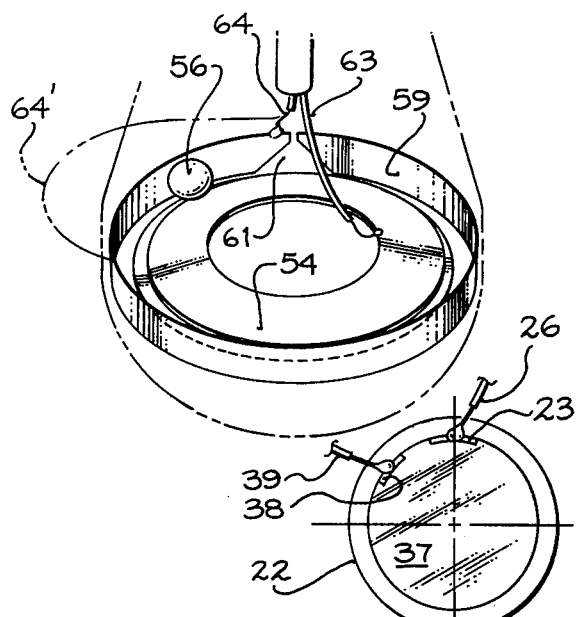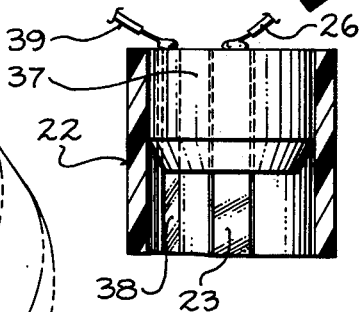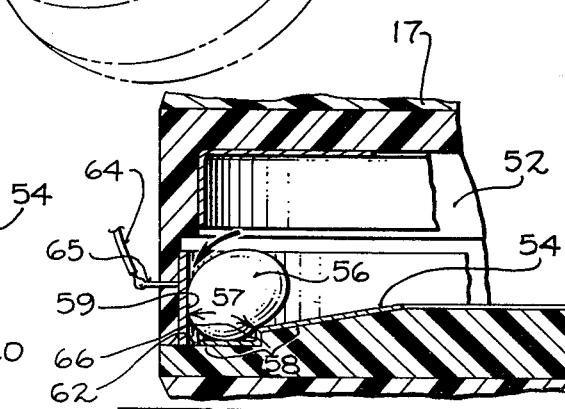

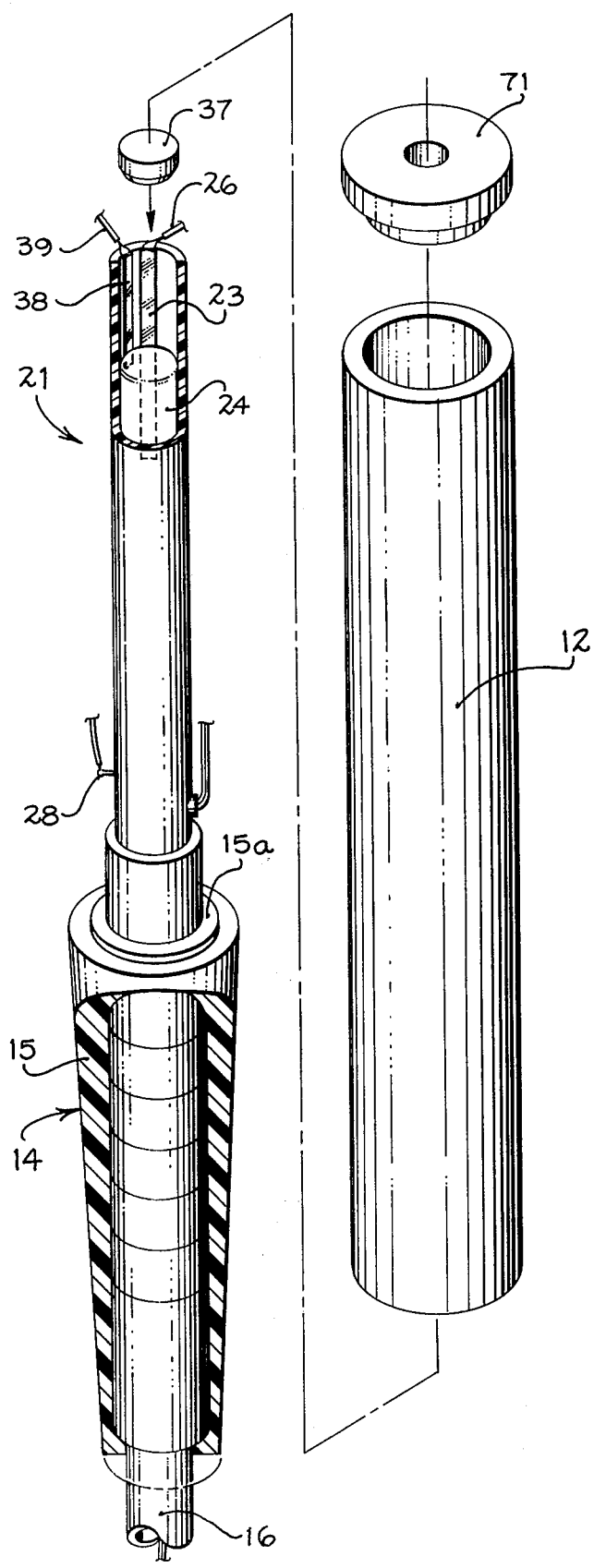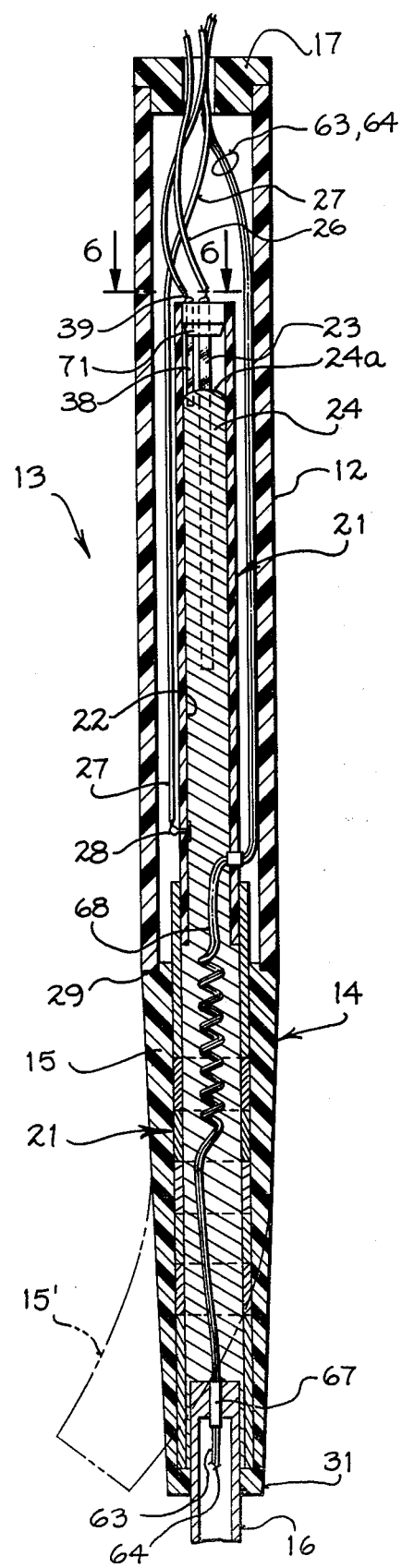

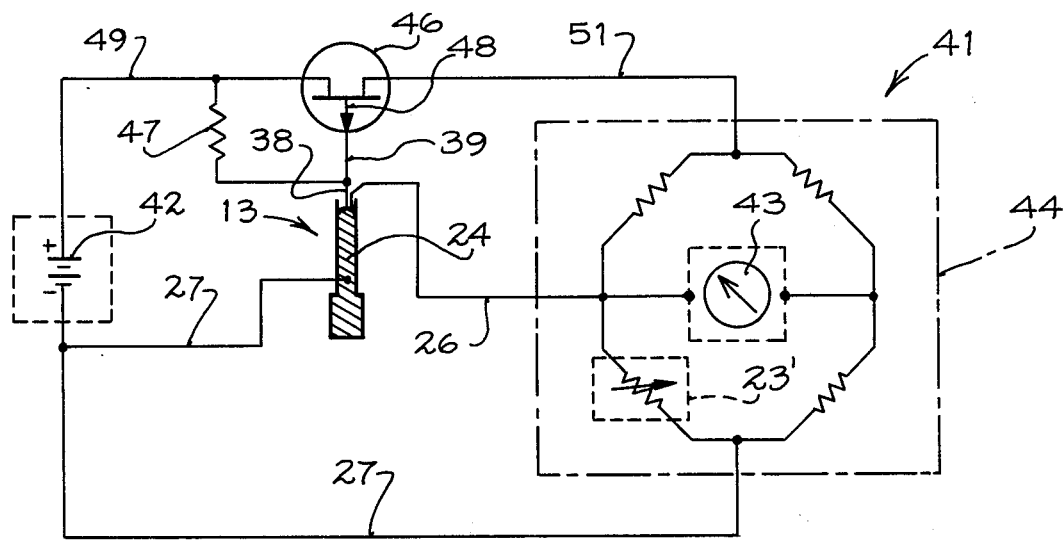
FIG_10
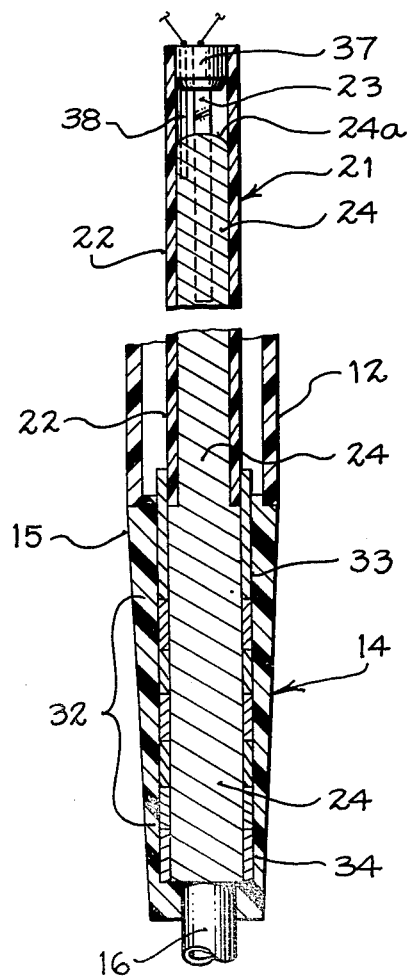
FIG_8
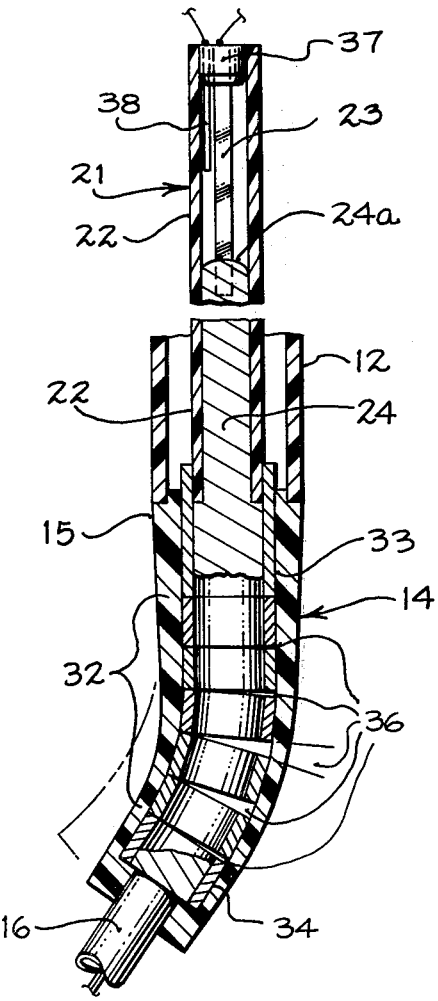
FIG_9

FLUID FLOW FORCE AND DIRECTION TRANSDUCER SYSTEM

BACKGROUND OF THE INVENTION

This invention pertains to a force and direction transducer system which is particularly useful in one application as a means for determining the direction and force of fluid flow such as the wind or currents.

SUMMARY OF THE INVENTION AND OBJECTS

In general a force transducer assembly for detecting the degree of force applied thereto includes an elongate sealed flexible container having a conductive column of mercury or other conductive liquid therein. An elongate resistance element extends into the container and column of mercury while an electrical lead is coupled to an end of the element. Another lead forms a connection to the column of mercury at a location displaced from the first lead. The resistance of the element defined between the two leads serves to form a portion of an electric circuit characterized as a resistance which varies in response to the height of the column of mercury in the container.

The direction of a force applied to the container includes a drag body adapted to be tilted in response to the application of a force thereto in which the drag body contains an elongate resistive element carried around the sidewall of an annular cavity formed therein. Means are provided for obtaining a variable resistance from said element in response to the direction in which the drag body tilts. Thus a conductive surface disposed within the cavity is spaced closely to the resistive element whereby a body of liquid conductive material can ride along a path defined between the resistive element and the conductive surface to make electrical connection therebetween at the lowest point along the resistive element when tipped. Leads coupled respectively to an end of the element and to the conductive surface serve to permit a portion of the resistance of said element to be incorporated into a circuit for representing associated directions of applied force.

In general it is an object of the present invention to provide an improved force and direction transducer assembly.

Other objects and advantages of the invention will become more readily evident from the following detailed description of a preferred embodiment when considered in conjunction with the drawings.

BRIEF DESCRIPTION OF THE DRAWINGS

FIG. 1 shows a diagrammatic perspective view partially broken away of a force and direction transducing device according to the invention;

FIG. 2 shows a diagrammatic perspective view of a detail of the construction in FIG. 1;

FIG. 3 shows an elevation section view of an enlarged detail taken in the region of the arrow 3 of FIG. 1;

FIG. 4 shows a diagrammatic exploded perspective view with portions broken away for clarity of a force transducer assembly according to the invention;

FIG. 5 shows an elevation section view taken along the line 5—5 of FIG. 1;

FIG. 6 shows a plan view in section taken along the line 6—6 of FIG. 5;

FIG. 7 shows an enlarged elevation section view of the detail at the top of tube assembly 21;

FIG. 8 shows an enlarged elevation section view of portion of FIG. 2 according to the invention;

FIG. 9 shows an elevation section view according to FIG. 8 in which a force transducer assembly 13 has been deflected; and FIG. 10 shows a diagrammatic view of an electrical system according to the invention.

DETAILED DESCRIPTION OF PREFERRED EMBODIMENT

As shown in FIG. 1 a transducer assembly 10 comprises means for detecting the amount of force applied thereto as well as detecting the direction thereof. While it will be readily evident that the invention as described herein has application in a number of different situations, as disclosed further below reference herein will be made only to the application of measuring air or water speed and direction as can be used for reporting aspects of the general weather conditions.

Means for suitably supporting assembly 10 to depend downwardly comprises a clamp 11 engaged around the upper end of an elongate, semi-rigid housing 12 of a force transducer assembly 13, shown best in FIG. 5. For example, housing 12 can be made of a material such as ABS plastic in order to form a light weight rigid cylindrical body.

In addition to force transducer assembly 13, there is provided a direction transducing means 20 as shown in FIG. 1 and described further below. Assembly 13 includes an elongate mounting body assembly 14 such as the elongate flexible tapered sheath 15 formed of a laterally deflectable or bendable elastomeric material such as silicone.

An elongate extension arm 16 depends downwardly from the lower end of mounting body 14 whereby deflecting movement of extension arm 16 serves to bend sheath 15 as shown in FIG. 5 to position 15'.

Drag body 17 of suitable light weight rigid material carried by extension arm 16 moves in various directions in response to forces applied thereto, such as the wind blowing on the drag body. Thus as shown in FIG. 1 arcuate pivoting movement representative of forces applied to drag body 17 is indicated by arrow 18 whereas arrow 19 represents rotational movement of drag body 17 variously throughout 360°.

Drag body 17 carries means described further below serving to indicate the direction or azimuth of a force applied thereto while, as noted above the amount of any such force is measured by force transducer assembly 13 as now to be described.

An elongate hollow tube assembly 21 extends from the upper end of a pliable tube 22 of vinyl material to the top of extension arm 16. An elongate resistive element 23 carried by the sidewall of tube 22 extends downwardly within tube assembly 21. Resistive element 23 forms a portion of an electric circuit as described further below.

A deposit 24 of an electrically conductive fluid such as mercury disposed within tube assembly 21 in electrically conductive relation to resistive element 23 moves between advanced and retracted positions in response to bending movements of the lower portion of tube assembly 21 as can be induced by deflection of drag body 17. Thus as the convex meniscus 24a of deposit 24 rises and falls within tube assembly 21 the electrical resistance varies between a first and second lead or connection. Thus a first lead or connection 26 is coupled to the upper end of element 23 while a second lead 27 is electrically coupled to the column of mercury 24 via the connection point 28. As thus arranged it is clearly evident that as the column of mercury 24 drops, an increasing amount of resistive element 23 will be defined between connections 26, 27.

The lower portion of force transducer assembly 13 comprises means carried by the elongate hollow tubing 22 serving to enlarge the interior volume within tube assembly 21 in response to bending mounting body assembly 14 so as to cause the column of mercury 24 to progressively drop therein in response to increasing deflection of the sheath 15.

Thus the elongate elastic sheath 15 includes a tapered sidewall which becomes progressively thinner in a direction leading from its proximal end 29 to its distal end 31. The upper end of sheath 15 is carried by and extends downwardly from housing 12. Preferrably a shoulder 15a is formed concentrically with the circumference of the upper end of sheath 15 for limited penetration into housing 12 so as to provide a more secure connection thereto.

Annular means carried to extend along and within sheath 15 substantially maintains the inner diameter of the hollow elongate opening defined within tube assembly 21 as the lower end of assembly 14 is deflected as now to be described.

Means for maintaining the diameter of the hollow elongate opening within tube assembly 21 at its lower end during deflection comprises a plurality of annular rings of semi-rigid material, such as plastic, stacked tightly one above the other and fastened to the wall of sleeve 15.

The tapered sidewall of sheath 15 provides a progressively increased stiffness so that sheath 15 tends to be bent in a circular arc, as at 15' in FIG. 5.

Thus, the lower end of tube assembly 21 can be deflected at its lower end in a substantially arcuate manner taken along the periphery of a circle while at the same time enlarging the interior volume of tube assembly 21. For example, the group of five rings 32, disposed between upper and lower tubular connector elements 33, 34 respectively, are of semi-rigid material, such as plastic, and are stacked within sheath 15 and secured to the interior wall surface thereof so as to be tightly held together by the elastic action of the sheath. Thus, upon deflection of an end of the sheath in a given direction that side of the rings disposed opposite the direction of deflection is permitted to separate by virtue of the elastic sidewall to enlarge the volume within tube assembly 21.

Thus referring to FIG. 9 a spacing 36 develops to permit the mercury to drop to a lower position within tube 22, e.g. from 24a to 24a' (see FIG. 1).

A top closure or resilient plug 37, tapered at the bottom end, serves to retain the column of mercury 24 within tube assembly 21. At the same time resistive element 23 passes upwardly alongside plug 37 so as to form a connection with lead 26. In addition, plug 37 serves to hold a downwardly depending switch probe 38 passing upwardly through the body of plug 37. Probe 38 connects to a lead 39 whereby as the meniscus 24a of column 24 rises to a point engaging probe 38 a circuit as now to be described will be deactivated indicating that no force is being applied to the transducer. The fact that tube 22 is made of a pliable vinyl material permits the column 24 of mercury to rise and fall therein even though plug 37 seals the upper end of tube 22 since the wall of tube 22 can collapse as column 24 drops.

Circuit 42 comprises a DC power supply, such as a battery 42. A bridge circuit 44 includes an indicator 43 of known design extending thereacross for operation as follows. One leg of bridge 44 comprises a variable resistance 23' shown in phantom lines in FIG. 10 as representative of the varying resistance defined between connections 26 and 27.

Means forming a control switch deactivates circuit 41 upon contact between probe 38 and the body 24 of mercury. Conversely probe 38 automatically activates circuit 41 as the column of mercury drops in response to the application of force to the lower end of transducer assembly 13. The switch comprises a semiconductor switching device known as a "J" type field effect transistor or JFET 46. A resistor 47 coupled to gate 48 serves to maintain a voltage supply to gate 48 so as to maintain switch 46 in a conductive mode between leads 49, 51. However, upon engagement of probe 38 with mercury 24 voltage on gate 48 will drop to ground by virtue of connection 27. As gate 48 is grounded JFET 46 will be biased into a non-conducting mode.

However, as soon as the mercury drops in response to force switch 46 conducts and the system is activated whereby variations in the resistance between connections 26 and 27 are detected by virtue of the fluctuations in the height of the mercury in column 24. These impedance variations are introduced into one of the four legs of bridge circuit 44 to provide a variable output on indicator circuit 43.

Means carried in drag body 17 generates information representative of the direction of applied force. Accordingly, drag body 17 includes a cavity 52 formed with a circular sidewall 53 hereinafter referred to as a circular cavity. Cavity 52 includes a circular conductive bottom surface 54 such as an annular foil of stainless steel disposed upon a radially outwardly tapered portion of the bottom of cavity 52. In this way the central portions of the bottom of cavity 52 and foil 54 include raised central portions serving to provide a natural drainage of a spherical deposit of mercury 56 in a direction leading radially outwardly.

An annular shaped channel or groove 57 bounds the edge margin 58 of bottom surface 54. Sidewall 53 carries a band 59 of resistive material therearound with the exception of a narrow gap 61 serving to define the ends of band 59.

Band 59 lies radially spaced from the conductive portions of bottom surface 54 as indicated by the gap 62.

A first electrical connection 64 coupled to a first end of band 59 via contact 65 and a second electrical connection 63 coupled to conductive bottom surface 54 are coupled together electrically by the deposit 56 of mercury within cavity 52 thereby providing an electrical connection between bottom surface 54 and band or strip 59. The "ball" of mercury provides a large "footprint" or region of contact so as to make good contact. Further, since the mercury does not wear a path around cavity 52 it will require little if any maintenance or repair.

The resistance defined between the fist and second connections 64, 63 via deposit 56 provides a representation of the direction of the applied force. For example, when a force is applied to drag body 17 it will be deflected in the manner shown in phantom lines in FIG. 1 to a lesser or greater degree. Such deflection causes the deposit 56 of mercury to roll to the lowest point in channel 57 thereby making contact between the electrically conducting surface 54 and the resistive band 59 at that point. As shown in FIG. 2 connection is made between band 59 and surface 54 at a position incorporating relatively little displacement 55 along band 59 so that the resistance will be relatively small and indicative of the direction associated therewith. The foregoing remains true for all positions of band 59 with the possible exception of the region adjacent gap 61.

The ends of band 59 are tapered as shown in order to cause the deposit of mercury to make a relatively sharp transition from one end of the band to the other. As thus arranged engagement is minimized between the deposit 56 and band 59 until deposit 56 has reached substantially a 360° azimuth. At that point contact is made between deposit 56 and the right hand end of band 59.

The radially inner edge of channel 57 is defined by an upwardly directed step 66. A deposit 56 of mercury, or other non-wettable, highly coherent conductive liquid, forms a generally spherically shaped body of sufficient size to cause one side of the body to ride against step 66 while the weight of deposit 56 urges the other side of body 56 against strip or band 59 to maintain contact therebetween under the weight of the deposit 56 of mercury.

The foregoing means for urging deposit 56 into band 59 serves to retain the deposit at a given position and in this manner provides something of a "memory" as to the last previous wind direction until the wind again blows.

Preferably leads 63, 64 are joined together, passed through a seal 67 and extend upwardly through mercury 24 in the lower bendable part of assembly 13. In this section it is preferred to dispose these two wires in a coiled manner as shown at 68 in order to permit the leads to be extensible. Leads then pass outwardly through the sidewall of tubing 22 via the seal 69 to continue upwardly and outwardly of housing 12 via an opening formed in a plug or cap 71.

From the foregoing it will be readily evident that there has been provided an improved force and direction transducer assembly.

I claim:

1. In a force transducer system including a drag body of a type adapted to move in response to application of force thereto, means for supporting said body for such movement, force transducer means coupled to the last named means and responsive to deflection of said drag body for registering the degree of force applied to said drag body, said transducer means being characterized by an elongate flexible hollow member, an elongate resistive element adapted to form a portion of an electric circuit extending along and within said member, and conductive fluid disposed within said hollow member in electrically conductive relation to said resistive element to move between advanced and retracted positions in response to bending movements of said member induced by deflection of said drag body, said movement of said conductive fluid serving to vary the resistance of that portion of said element adapted to be included in said circuit portion.

2. In a force transducer system according to claim 1 comprising means carried by said elongate, flexible, hollow member serving to enlarge the interior volume therein in response to bending said member so as to cause conductive fluid to progressively drop therein in response to increasing deflection of said member.

3. In a force transducer system according to claim 2 in which the last named means comprises an elongate elastic sheath formed to include a tapered sidewall becoming progressively thinner in a direction leading from its proximal end to its distal end, and annular means carried to extend along and within said sheath for substantially maintaining a diameter of the hollow elongate opening within said member as the member is deflected.

4. In a force transducer system according to claim 2 in which the last named means comprises an elongate elastic sheath, and a plurality of annular rings of semi-rigid material, said rings being stacked within said sheath and secured to the interior wall of said sheath to be held tightly together by the elastic action of said sheath whereby upon deflection of an end of said sheath in a given direction that side of said rings disposed opposite said direction is permitted to separate by said eleastic sidewall to enlarge the volume within said annular means.

5. In a force transducer system comprising an elongate, hollow member, an elongate resistive element carried by said member and extending along and within said member, said element being adapted to define a portion of an electric circuit, a column of mercury within said member in electrically coupled relation to said element, and means for lowering the level of the mercury column in response to bending the elongate hollow member so as to vary the resistance of that portion of said element adapted to define said electric circuit portion.

6. In a force transducer system according to claim 5 comprising means forming a drag body adapted to be moved by fluid flow, said drag body being operatively coupled to said hollow member to apply a force thereto to bend same in response to movement of said drag body.

7. In a force transducer system according to claim 6 comprising means carried in said drag body for providing information indicative of the direction of the applied force.

8. In a force transducer system according to claim 5 comprising a circular cavity within said body, said cavity including a circular conductive bottom surface having a raised central portion, an annular channel or groove bounding the edge margin of said circular bottom surface, said cavity including a cylindrical sidewall, a band of resistive material carried by said sidewall and extending substantially fully around said sidewall leaving a narrow gap to define the ends of said band, said band being spaced from the conductive portions of said bottom surface, a first electrical connection coupled to a first end of said band and a second electrical connection coupled to said conductive bottom surface, and a deposit of mercury within said cavity for providing an electrical connection between said bottom surface and said band, the resistance defined between said first and second connections via said deposit of mercury providing a representation of the direction of the applied force.

9. In a force transducer system according to claim 5 comprising means disposed relative to said column of mercury serving to make electrical contact therewith at a predetermined height thereof for de-energizing the electric circuit portion.

10. In a force transducer system comprising means carried in a drag body for providing information indicative of the direction of the applied force, the last named means including an annular cavity within said body, said cavity including a conductive bottom surface having a raised central portion, an annular channel or groove bounding the edge margin of said conductive bottom surface, said cavity including an annular sidewall, a strip of resistive material carried by said sidewall and extending substantially fully around said sidewall leaving a narrow gap to define the ends of said strip, said band being spaced from the conductive portions of said bottom surface, a first electrical connection coupled to a first end of said strip and a second electrical connection coupled to said conductive bottom surface, and a deposit of mercury within said cavity for providing an electrical connection between said bottom surface and said strip, the resistance defined between said first and second connections via said deposit of mercury providing a representation of the direction of the applied force.

11. In a force transducer system according to claim 10 in which the radially inner edge of said channel or groove is defined by an upwardly directed step and said deposit forms a generally spherically shaped body of sufficient size to cause one side of said body to ride against the step and urge the other side against said strip to maintain contact therebetween.

12. In a force transducer assembly of a type adapted to detect the degree of force applied thereto comprising an elongate sealed flexible container, a deposit of mercury forming a conductive column therein, an elongate resistance element extending into said container and column, an electrical lead coupled to said element, another lead coupled to said column to form a portion of a circuit characterized by resistance varying in response to the height of said column of mercury in said container and means responsive to externally applied force serving to vary the height of said column to vary said resistance.

13. In a force transducer assembly according to claim 12 in which said container includes flexible tubular means coupled to form a continuation thereof, and means for enlarging the volumetric capacity of said container and continuation in response to deflection of said continuation so as to lower said column of mercury to increase the resistance in said circuit portion.

14. In a force transducer assembly of a type adapted to detect the degree of force applied thereto comprising an elongate sealed flexible container, said flexible container being adapted to be deflected in response to force applied thereto, an elongate resistance element extending into said container, an electrical lead coupled to said element, a deposit of mercury in said container forming a conductive column therein in contact with said resistance element, and another lead coupled to said column to form a portion of a circuit between said leads characterized by a resistance varying in response to the height of said column of mercury in said container, said height varying in response to force applied to said flexible container.

15. In a force and direction transducer assembly a drag body adapted to be supported to receive a force applied thereto from various directions, said body including a cylindrical cavity, an elongate resistive element carried around said cavity on the wall thereof, a first lead coupled to an end of said element, a conductive surface disposed within said cavity in spaced relation to said element therearound a second lead coupled to said conductive surface, and a body of conductive material having a substantially spherical configuration serving to ride along a path between said element and said surface to make electrical connection therebetween at the lowest part of said element as the body is tipped so as to define a varying impedance between said leads.

16. A force transducer for indicating the direction of fluid flow forces applied thereto, comprising:
mounting means for supporting the transducer;
extension means depending from the mounting means;
a drag body carried by the extension means for tilting in response to the applied fluid force;
direction indicating means connected to the drag body;
a cavity within the direction indicating means;
a pair of adjacent spaced circuit elements positioned within the cavity, at least one of which is resistive;
a pair of conductive lead means coupled to the pair of circuit elements; and
a body of conductive fluid within the cavity which flows toward the lowest region of the cavity in response to the tilting of the drag body for bridging the space between the pair of adjacent circuit elements to establish an electrical resistance between the pair of lead means indicative of the direction of the applied force.

* * * * *